April 25, 1944. P. H. LIGHT 2,347,493
PROTECTION OF ALTERNATING CURRENT ELECTRIC POWER SYSTEMS
Filed July 10, 1943
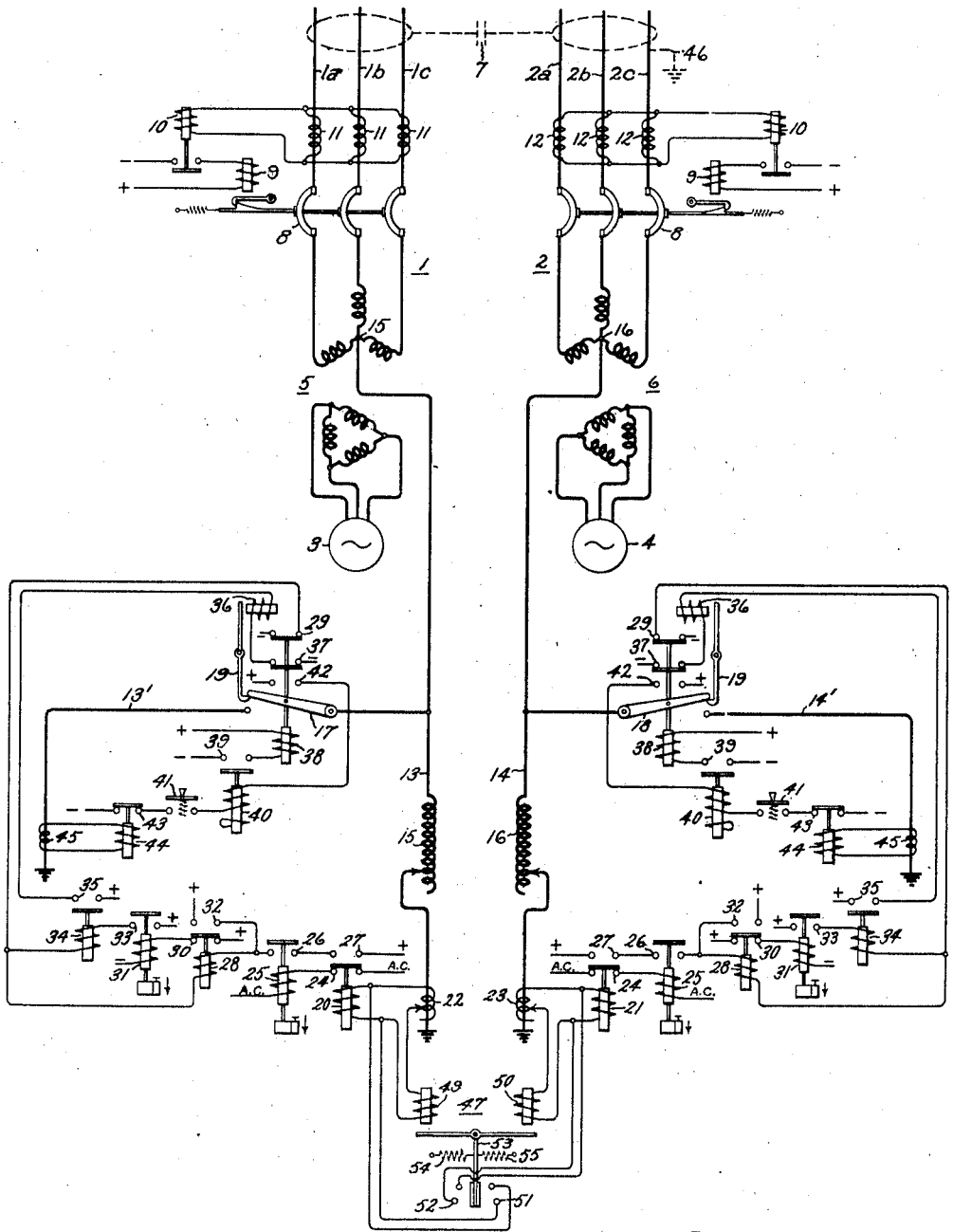
Inventor:
Philip H. Light,
by Harry E. Dunham
His Attorney.

Patented Apr. 25, 1944

2,347,493

UNITED STATES PATENT OFFICE 2,347,493

PROTECTION OF ALTERNATING CURRENT ELECTRIC POWER SYSTEMS

Philip H. Light, Schenectady, N. Y., assignor to General Electric Company, a corporation of New York Application July 19, 1943, Serial No. 494,188

7 Claims. (Cl. 171—97)

My invention relates to improvements in the protection of alternating current electric power systems and particularly systems wherein the phase conductors of two alternating current electric circuits are not directly conductively connected but are physically so related as to have a material capacitive coupling and especially circuits of the type wherein a fault to ground on one phase conductor of a circuit substantially increases the capacitive current to ground of the ungrounded phase conductors of the circuit.

In power systems which operate without a neutral point grounded more or less directly, single conductor to ground faults of a transitory or arcing character may be suppressed by a ground fault neutralizing device, as disclosed in United States Letters Patent 1,537,371, without interruption of service. Since a large percentage of the faults on alternating current electric systems involve initially, at least, only a single conductor to ground, such neutralizing device materially improves the service continuity factor. The neutralizing device is usually connected between a neutral point of the system and ground and is proportioned to have together with the transformer affording the neutral point, a zero-phase sequence inductance such as to provide on the occurrence of a ground on a phase conductor of the system a lagging current for effectively suppressing the capacitive current to ground of the ungrounded phase conductors. Usually the amount of the inductance furnished by the transformer in the neutralizer connection is a small proportion of the total inductance in this connection. In order to take care of faults which the ground fault neutralizer cannot suppress, a low impedance connection to ground may be established after the flow of lagging current in the neutralizer connection for a predetermined time without suppressing the ground fault, as disclosed in United States Letters Patent 1,378,557. This low impedance connection allows sufficient flow of fault current to insure the intended operation of ground fault responsive relays with which the system is usually provided to clear permanent ground faults.

If the phase conductors of two alternating current circuits are not directly conductively related but are mounted on the same supporting structure, such as towers, poles or the like, and it is desired to protect each circuit with its own ground fault neutralizer, then, in consequence of the mutual coupling between the two circuits, current will flow in the ground fault neutralizer of each circuit on the occurrence of a ground fault on one of the circuits. Since the establishment of the low impedance connection is dependent on the flow of current in the neutralizing connection for a predetermined time, the tendency is to establish a low impedance connection for both of the circuits although only one is at fault. With the establishment of the low impedance connection on the circuit not at fault, the ground fault neutralizer associated with this sound circuit is rendered ineffective to clear ground faults of a transitory or arcing character. In other words, in case of a permanent ground fault on one of the circuits, the protection afforded by the ground fault neutralizer associated with the other circuit is temporarily lost. Thus, if the sound circuit becomes subject to a ground fault before its neutralizing connection is re-established, this ground fault, irrespective of its character, will have to be cleared by the ground fault relays of the circuit. Accordingly, there will be circuit interruptions and the service continuity factor will be lowered.

An object of my invention is to provide, for the protection of two alternating current electric circuits whose phase conductors are not metallically or directly conductively connected but are physically so related as to have a material capacitive coupling and which are provided with ground fault neutralizers for protection against transitory ground faults, an improved arrangement whereby in the case of a ground fault on one circuit the ground fault neutralizer associated with the other circuit is at all times available to take care of transitory ground faults on its associated circuit. This and other objects of my invention will appear in more detail hereinafter.

In accordance with my invention, I provide means operative in dependence on a predetermined relation between the currents in the neutralizing connections on the occurrence of a ground fault on one phase conductor of one of the circuits for preventing the establishment of the low impedance connection to ground of the other circuit. Further in accordance with my invention, this means may be a relay device for operation in dependence on the difference between the currents in the neutralizing connections to render temporarily ineffective the means for establishing the low impedance connection or by-pass of the ground fault neutralizer in the sound circuit.

My invention will be better understood from the following description when considered in connection with the accompanying drawing, and its scope will be pointed out in the appended claims.

In the single figure of the accompanying drawing, I have diagrammatically illustrated an embodiment of my invention as applied to two polyphase alternating current electric circuits 1 and 2, which respectively comprise phase conductors 1a, 1b, 1c and 2a, 2b, 2c. As indicated by the sources 3 and 4, which supply the three-phase circuits 1 and 2, respectively, through delta-Y connected step-up power transformers 5 and 6, respectively, the phase conductors of the circuits 1 and 2 are not directly conductively related, that is, there is no metallic conductive path between them. However, it is to be understood that the circuits 1 and 2 are physically so related as to have a material capacitive coupling. Thus, the circuits 1 and 2 may be mounted on the same poles or towers, not shown, so that they are substantially parallel in position and accordingly subject to material capacitive coupling between all of the phase conductors of one circuit and all of the phase conductors of the other circuit. This is schematically illustrated by a single condenser 7, shown as interlinked between the phase conductors of the circuits 1 and 2.

For protection against ground faults of a permanent character, each of the circuits 1 and 2 is provided with a circuit breaker 8, shown as of the latched closed type and provided with a trip coil 9. Each circuit breaker 8 is arranged to have the circuit of its trip coil 9 controlled by ground fault responsive relays 10, examples of which are well known to the art. As illustrated, the relays 10 are simple overcurrent relays connected to be energized in accordance with the vectorial sum of the circuits in the phase conductors of the circuit by parallel connected current transformers 11 in the circuit 1 and 12 in the circuit 2.

For protection against ground faults of a transitory character, the circuits 1 and 2 are respectively provided with neutralizing connections 13 and 14 to ground from the neutral points 15 and 16 of their Y connected transformer high voltage windings. As shown, these neutralizing connections 13 and 14 comprise ground fault neutralizers 15 and 16, respectively, the inductances of which together with the zero-phase sequence inductances of the associated transformers 5 and 6, respectively, is such as to provide on the occurrence of a ground fault on one phase conductor of the associated circuit a lagging current for effectively suppressing the capacitive current to ground of the circuit at the grounded point. Where the extent of the circuit in service may vary, each of the ground fault neutralizers 15 and 16 is so arranged that its inductance can be varied to correspond to the capacitance to ground of the associated circuit in order to secure the desired suppressing operation.

In case of a so-called permanent type of ground fault which the ground fault neutralizer cannot suppress, it is customary to establish after a predetermined time a low impedance connection to ground from the neutral point of the circuit at fault so that sufficient ground fault current can flow to effect the intended operation of the circuit's ground fault relaying system, illustrated in part by the relays 10. Since the means for establishing the low impedance connection to ground from the neutral points 15 and 16 of the circuits 1 and 2 may be the same for each and are so shown, only one will be described, and corresponding reference numbers will be applied. Thus, in order that the circuit's ground fault relaying means may take care of nontransitory ground faults, there are provided means for establishing low impedance connections 13' and 14' to ground from the neutral points 15 and 16, respectively, in response to a predetermined current flow for a predetermined time in the neutralizing connections 13 and 14. For this purpose, the neutral points 15 and 16 may be arranged to be connected substantially directly to ground by the closing of suitable switching means herein illustrated as normally latched open but biased to close switches 17 and 18, respectively. The tripping of the latch 19 of the switches 17 and 18 is effected by a suitable time delay relay sequence which is initiated by the operation of closing relays 20 and 21, respectively. These relays are operative in dependence on the current in the neutralizing connections 13 and 14, respectively, and may be connected to be energized from current transformers 22 and 23, respectively, in series therewith, as shown. As will be apparent to those skilled in the art, these current transformers can be provided with suitable output adjusting means to correspond to the tap settings of the ground fault neutralizers, as disclosed, for example, in United States Letters Patent 2,247,332, granted June 24, 1941. The normally closed contacts 24 of the relays 20 and 21 maintain the energizing circuit of a time delay drop-out relay 25 which may be of the induction disk alternating current energized type, examples of which are well known to the art.

When the relay 25 closes its contacts 26 while the associated relays 20 or 21 are energized with their contacts 27 closed, the circuit of an auxiliary relay 28 is completed through b auxiliary switch contacts 29 on the respectively associated grounding switch 17 or 18. This auxiliary relay 28, through its normally closed contacts 30, controls the circuit of a second time delay drop-out relay 31 and, when energized, also completes its own circuit through its normally open contacts 32. When the second time delay relay 31 drops out, the closing of its normally open contacts 33 completes the circuit of a tripping relay 34. This relay picks up to close its normally open contacts 35 thereby to complete the circuit of the grounding switch trip coil 36 through b auxiliary switch contacts 37 on the grounding switch. The energization of the trip coil 36 actuates the latch 19 to effect the closing of the respective grounding switch 17 or 18.

For restoring the grounding switches 17 and 18 to the open position, they may be provided with suitable opening means indicated as a winding 38 whose circuit is controlled by the contacts 39 of a relay 40. As illustrated, this relay is of the so-called hesitating control type which, when once energized to close its contacts, drops out with a time delay sufficient to insure the completion of the opening action of the grounding switch. The circuit of the closing control relay 40 includes a control switch 41 which may be manually operated, a auxiliary switch contacts 42 on the respective grounding switch, and the normally closed contacts 43 of an opening prevention relay 44. This relay is arranged to be energized in dependence on the current in the low impedance ground connection through the respective grounding switch so that this switch cannot be opened while it is carrying current. The relay 44 may be connected to be energized from a current transformer 45 in series relation with the ground connection through the respective grounding switches 17 and 18, as shown.

On the occurrence of a ground fault on either of the circuits 1, 2, as indicated, for example, at 46 for the circuit 2, it is obvious that because of the capacitive coupling of the circuits 1 and 2, the increased capacitive current to ground of the circuit 2 will be augmented by the capacitive current between the circuits 1 and 2. This additional current has to return to the sound circuit 1, in this case by way of this circuit's neutralizing connection 13. Consequently, the closing relay 20 associated with the neutralizing connection of the sound circuit is energized and starts the timing sequence to close the grounding switch 17 associated with the circuit 1, although there is no fault on this circuit. If the ground fault on the circuit 2 lasts long enough for the completion of the timing sequence of the relay control for closing the grounding switch 17 of the circuit 1, then this circuit is deprived of its transitory ground fault protection, and its service continuity factor is lowered.

In accordance with my invention, I provide means such as a relay 47 which operates selectively in dependence on a predetermined relation between the currents in the neutralizing connections 13 and 14 of the circuits 1 and 2 on the occurrence of a ground fault on one of these circuits to prevent the establishment of the low impedance connection to ground of the other or sound circuit. As shown, the selective relay 47 is of the differential type and comprises two windings 49 and 50 respectively connected to be energized in accordance with the currents in the neutralizing connections 13 and 14. For preventing the closing operation of the grounding switch in the low impedance neutral connection of the sound circuit, the relay 47, as shown, is provided with contacts 51 and 52, which as shown are so arranged as to prevent the pick-up operation of the closing relay 20 or 21 associated with the sound circuit. Thus, the contacts 51 of the differential relay 47, when closed, short circuit the energizing winding of the closing relay 20, and the contacts 52 of the relay 47, when closed, short circuit the energizing winding of the closing relay 21.

Assuming the parts positioned as shown in the drawing and that a ground fault occurs on the phase conductor 2c of the circuit 2, as indicated at 46, then the unbalanced capacitive current of this circuit and the mutual capacitive current between the circuits 1 and 2 go to ground over the neutralizing connection 14. The lagging current provided by the ground fault neutralizer 16 will compensate the capacitive current of the circuit 2 at the grounded point 46 and eliminate the fault if of a transitory character. The mutual capacitive current in consequence of the capacitive coupling returns by way of the neutralizing connection 13 to circuit 1. Assuming first that the current ratings of the neutralizing connections 13 and 14 are the same, then the current in the neutralizing connection 13 of the sound circuit will in general be smaller than the current in the neutralizing connection 14 of the faulty circuit. Accordingly, the differential relay 47, which is a relatively sensitive and quick acting device as compared with the closing relays 20 and 21, will operate to close its contacts 51 and thereby short circuit the closing relay 20, thus preventing the starting of the timing sequence which would effect the closing of the switch 17. If the ground fault neutralizer is unable to suppress the ground fault at 46, the timing sequence for the grounding switch 18 will continue until this switch is closed, as herein previously described and also as disclosed in United States Letters Patent 2,296,109, granted September 15, 1942. As long as the mutual capacitive current appears in the neutralizing connection 14, the relay 47 will maintain the closing relay 20 inoperative. Upon the closing of the grounding switch 18, however, the winding 50 of the relay 47 will no longer be energized, and this relay will open its contacts 51 to remove the short circuit from the closing relay 20 so that if a ground fault occurs on the circuit 1 and it is not of a transitory character such that it can be suppressed by the action of the ground fault neutralizer 15, the grounding switch 17 will be closed in accordance with the proper timing sequence. While I have particularly described the operation of my invention for a ground fault on the circuit 2, the operation for a ground fault on the circuit 1 will be obvious.

If each of the circuits 1 and 2 should simultaneously be subjected to a ground fault on one conductor, then the currents in the windings 49 and 50 of the selective relay 47 would be approximately equal so that the circuit controlling member 53 of the relay 47 would be maintained in the neutral position shown by its biasing springs 54 and 55. These obviously can be made adjustable so as to require a predetermined difference between the currents in the windings 49 and 50 to effect the closing of either the contacts 51 or the contacts 52 as will be apparent to those skilled in the art. In case of inequality of the currents of the neutralizing circuits 13 and 14 when both circuits are simultaneously affected by ground faults on one conductor of each circuit, lack of balance in the outputs of the current transformers 22 and 23 may be compensated by so proportioning the windings 49 and 50 of the differential relay 47 as to provide equal attractive efforts on the movable circuit controlling member 53 or the fulcrum of this member may be adjustable to provide the necessary balancing action, as will be obvious to those skilled in the art of relay construction. The desired differential or balancing action by the relay 47 in case of tap changes of the ground fault neutralizers 15 and 16 to correspond with the amount of the respectively associated circuits 1 and 2 in service can also be maintained by suitable taps on the current transformers 22 and 23, respectively, either primary or secondary taps as will be apparent to those skilled in the art.

From the foregoing, it will be apparent to those skilled in the art that my invention is applicable if the phase conductors of the circuits 1 and 2 are not directly conductively connected. Accordingly although I have shown two separate sources 3 and 4 for the circuits 1 and 2, respectively, these two circuits, as far as my invention is concerned, may be supplied from the same bus or their phase conductors 1a, 1b, 1c and 2a, 2b, 2c may be inductively coupled as by a polyphase transformer, not shown.

While I have shown and described my invention in considerable detail, I do not desire to be limited to the exact arrangement shown, but seek to cover in the appended claims all those modifications that fall within the true spirit and scope of my invention.

What I claim as new and desire to secure by Letters Patent of the United States is:

1. In combination, two alternating current electric circuits whose phase conductors are not directly conductively connected but are physically so related as to have a material capacitive coupling, each of said circuits having a neutral point, an impedance connection between each of said neutral points and ground, means respectively dependent on the currents in said connections for changing the impedances to ground of said neutral points, and means operative in dependence on a predetermined relation between the currents in said connections on the occurrence of a ground fault on one of the circuits for preventing a change in the impedance to ground of the neutral point of the other circuit.

2. In combination, two three-phase alternating current electric circuits whose phase conductors are not directly conductively connected but are physically parallel, each of said circuits having a neutral point, an impedance connection to ground from the neutral point of each of said circuits, means respectively dependent on the currents in said connections for reducing the impedances to ground of said neutral points, and means operative in dependence on the difference between the currents in said connections on the occurrence of a ground fault on one of the circuits for preventing a reduction in the impedance to ground of the neutral point of the other circuit.

3. In combination, two three-phase alternating current electric circuits whose phase conductors are not directly conductively connected but are physically parallel, each of said circuits having a neutral point and being of the type wherein a fault to ground on one phase conductor of the circuit substantially increases the capacitive current to ground of the ungrounded phase conductors of the circuit, a neutralizing connection to ground from the neutral point of each of the circuits having a zero-phase sequence inductance proportioned to provide on the occurrence of a ground fault on one phase conductor of the circuit a lagging current for effectively suppressing the capacitive current to ground of the circuit at the grounded point, means for establishing a low impedance connection to ground from the neutral point of each of said circuits operative in dependence on the current in the neutralizing connection of the circuit a predetermined time after the occurrence on a phase conductor of the circuit of a ground fault which is not suppressed by the lagging current in the neutralizing connection, and differential relay means comprising windings respectively connected to be energized in accordance with the currents in said neutralizing connections on the occurrence of a ground fault on one phase conductor of one of the circuits for preventing the establishment of the low impedance connection to ground of the other circuit.

4. In combination, two polyphase alternating current electric circuits whose phase conductors are not directly conductively connected but are physically so related as to have a material capacitive coupling, each of said circuits being of the type wherein a fault to ground on one phase conductor of the circuit substantially increases the capacitive current to ground of the ungrounded phase conductors of the circuit, a zero-phase sequence inductive connection to ground for each circuit proportioned to provide on the occurrence of a ground fault on one phase conductor of the circuit a lagging current for effectively suppressing the capacitive current to ground of the circuit at the grounded point, means for establishing a low impedance connection to ground for each of said circuits operative in dependence on the current in the inductive connection of the circuit a predetermined time after the occurrence on a phase conductor of the circuit of a ground fault which is not suppressed by the lagging current in the inductive connection of the circuit, and means operative in dependence on a predetermined relation between the currents in the inductive connections to ground of said circuits on the occurrence of a ground fault on one phase conductor of one of the circuits for preventing the establishment of the low impedance connection to ground of the other circuit.

5. In combination, two polyphase alternating current electric circuits whose phase conductors are not directly conductively connected but are physically so related as to have a material capacity coupling, each of said circuits being of the type wherein a fault to ground on one phase conductor of the circuit substantially increases the capacitive current to ground of the ungrounded phase conductors of the circuit, a zero-phase sequence inductive connection to ground for each circuit proportioned to provide on the occurrence of a ground fault on one phase conductor of the circuit a lagging current for effectively suppressing the capacitive current to ground of the circuit at the grounded point, means for establishing a low impedance connection to ground for each of said circuits operative in dependence on the current in the inductive connection of the circuit a predetermined time after the occurrence on a phase conductor of the circuit of a ground fault which is not suppressed by the lagging current in the inductive connection of the circuit, and means operative in dependence on the difference between the currents in the inductive connections to ground of said circuits on the occurrence of a ground fault on one phase conductor of one of the circuits for preventing the establishment of the low impedance connection to ground of the other circuit.

6. In combination, two three-phase alternating current electric circuits whose phase conductors are not directly conductively connected but are physically so related as to have a material capacitive coupling, each having a neutral point and each being of the type wherein a fault to ground on one phase conductor of the circuit substantially increases the capacitive current to ground of the ungrounded phase conductors of the circuit, a neutralizing connection to ground from the neutral point of each of the circuits having a zero-phase sequence inductance proportioned to provide on the occurrence of a ground fault on one phase conductor of the circuit a lagging current for effectively suppressing the capacitive current to ground of the circuit at the grounded point, means for establishing a low impedance connection to ground from the neutral point of each of said circuits a predetermined time after the occurrence on a phase conductor of the circuit of a ground fault which is not suppressed by the lagging current in the neutralizing connection comprising relays respectively connected to be energized in dependence on the currents in said neutralizing connections, and differential relay means comprising windings respectively connected to be energized in accordance with the currents in said neutralizing connections operative on the occurrence of a ground fault on one phase conductor of one of the circuits for preventing the operation of the relay connected to be energized in accordance with the current in the neutralizing connection of the other circuit.

7. In combination, two alternating current electric circuits each having a neutral point, an impedance connection between each of said neutral points and ground, means respectively controlled in dependence on the currents in said connections for changing the impedances thereof, and means responsive to a ground fault on one of said circuits for rendering inoperative the impedance changing means associated with the other circuit.

PHILIP H. LIGHT.